United States Patent [19]
Sato et al.

[11] Patent Number: 5,159,953
[45] Date of Patent: Nov. 3, 1992

[54] CHECK VALVE APPARATUS FOR FUEL TANK

[75] Inventors: Kyokuichi Sato; Juichi Fujita, both of Okayama, Japan

[73] Assignee: OM Industrial Co., Ltd., Oakayama, Japan

[21] Appl. No.: 758,891

[22] Filed: Sep. 11, 1991

[51] Int. Cl.$^5$ .............................. F16K 15/03
[52] U.S. Cl. ...................... 137/527.8; 137/515; 137/454.2
[58] Field of Search ............. 137/454.2, 515, 527, 137/527.6, 527.8

[56] References Cited

U.S. PATENT DOCUMENTS

| | | | |
|---|---|---|---|
| 202,219 | 4/1878 | Belt | 137/527.8 |
| 1,107,096 | 8/1914 | Mulloy, Sr. | 137/527.8 |
| 1,399,004 | 12/1921 | Case | 137/527.8 X |
| 2,664,264 | 12/1953 | Fennema | 137/454.2 X |
| 2,711,188 | 6/1955 | Nickerson | 137/527.8 |
| 2,787,206 | 4/1957 | Dustman | 137/527.6 X |
| 3,395,727 | 8/1968 | Weise et al. | 137/454.2 X |
| 3,448,465 | 6/1969 | Pierce et al. | 137/527.8 X |
| 4,128,111 | 12/1978 | Hansen et al. | 137/527.8 X |
| 4,295,412 | 10/1981 | Hachiro | 137/454.2 X |
| 4,492,249 | 1/1985 | Arino et al. | 137/454.2 X |
| 4,850,059 | 7/1989 | Dickerson | 137/527.6 X |

Primary Examiner—John Rivell
Attorney, Agent, or Firm—Koda and Androlia

[57] ABSTRACT

A check valve apparatus for a fuel tank of an automobile or the like comprises only two members, i.e., a valve plate made of synthetic resin which is integral with rotating rod members and a valve body made of synthetic resin and having an annular configuration which is integral with bearings or the valve plate. The check valve apparatus is simple in structure and easy to assemble. During operation after it has been assembled, it will not easily dislodge from a pipe, and when the operator intends to detach it from the pipe, it will be readily detached.

6 Claims, 5 Drawing Sheets

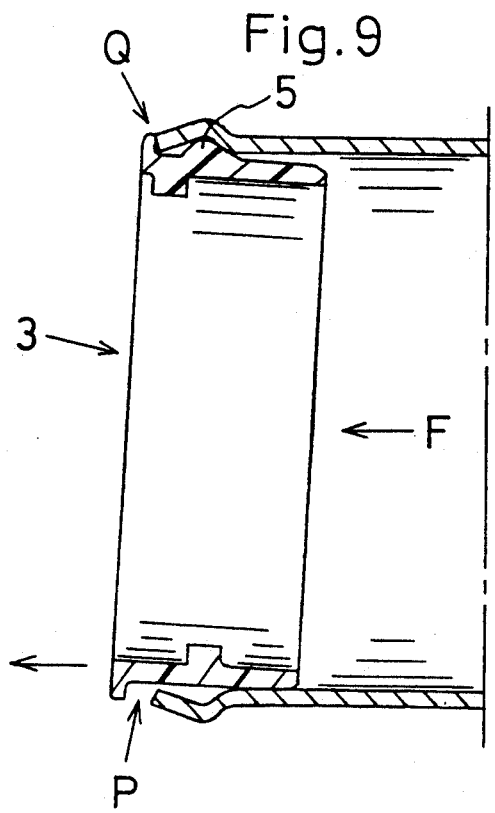
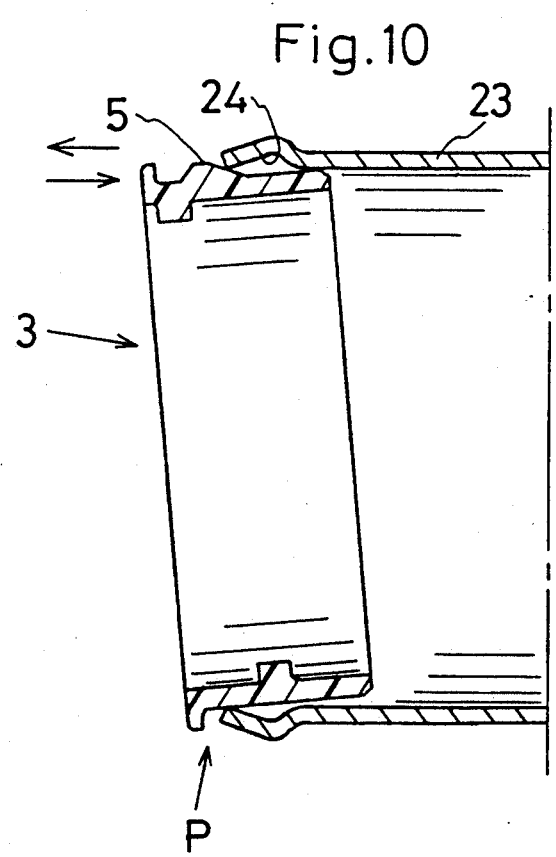

CHECK VALVE APPARATUS FOR FUEL TANK

BACKGROUND OF THE INVENTION

1. Industrial Field of the Invention

The present invention relates to a check valve apparatus for a fuel tank which is provided in a an end of pipe from a fuel supply spout to the fuel tank so that the check valve apparatus is opened when fuel flows toward the fuel tank at the time of fuel supply and closed when fuel flows reversely.

2. Description of the Prior Art

An example of conventional check valve apparatus for a fuel tank which functions in such a manner as to be open when fuel flows normally toward the tank at the time of fuel supply and closed when fuel flows reversely is disclosed in U.S. Pat. No. 4,128,111. This apparatus comprises independent component parts, such as a valve body, a valve plate, rotational axis pins, and the number of parts is large. Further, it is necessary to smash the tip of each of the rotational axis pin after the pin is assembled with the apparatus so that the pin will not dislodge.

The present invention has been accomplished to facilitate the assembling operation of such a check valve apparatus for a fuel tank and to reduce the number of its component parts. At the same time, there has been studied the structure of the check valve apparatus with which a valve plate will not be easily detached and the assembled apparatus will not accidentally come off from pipe.

SUMMARY OF THE INVENTION

A check valve apparatus for a fuel tank according to the present invention is characterized in that it comprises a valve plate made of synthetic resin, which is integral with rotating rod members at a position displaced from the circle center point of the valve plate, and a valve body made of synthetic resin including an annular valve seat which supports the outer periphery of the valve plate, the valve body including retainer projections which are provided on some portions of the outer peripheral side of the valve body, on the other side of which portions there are provided bearing sections corresponding to the rotating rod members of the valve plate.

The annular valve body in this case may be arranged in such a manner that the retainer projections are additionally formed at certain positions other than the two positions on the outer peripheral side of the valve body corresponding to those of the bearing sections. A positioning projection may be provided on the outer periphery of the valve body so as to be fitted in a cutout formed in the pipe. Projections may be further formed in the vicinity of the bearing sections in order to function as stoppers against the valve opening.

BRIEF DESCRIPTION OF THE DRAWINGS

FIG. 9 is a vertical cross-sectional view showing that the valve body will not easily come off: and FIG. 10 is a vertical cross-sectional view showing, on the contrary, that the valve body can be easily inserted into the pipe.

DETAILED DESCRIPTION OF THE INVENTION

Figure 7:
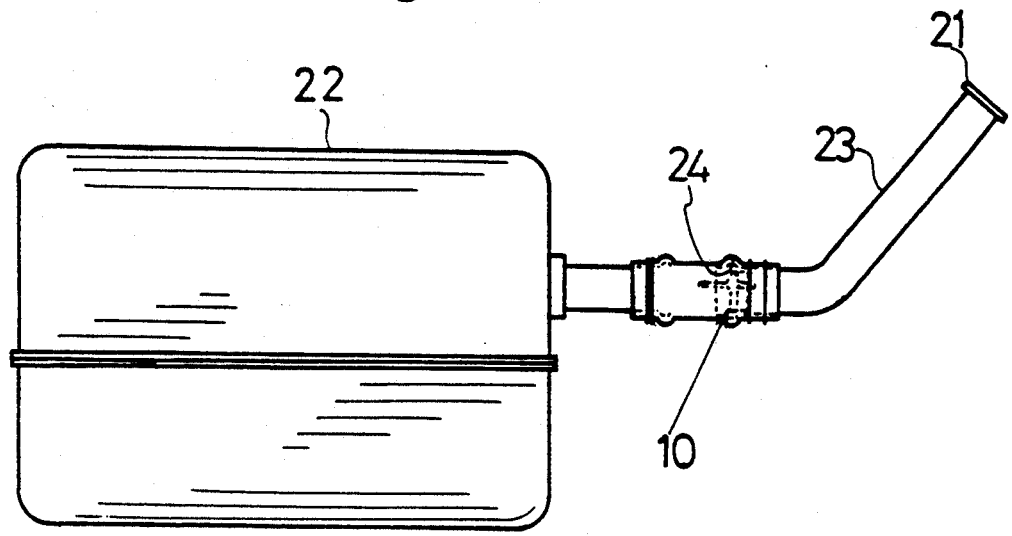
FIG. 7 is a schematic view of the entire structure of an automobile fuel tank.

As shown in FIG. 7, a check valve apparatus 10 for a fuel tank used, for example, in an automobile, according to the present invention is provided within an end of a pipe 23 from a fuel supply spout 21 to the fuel tank 22. The check valve apparatus 10 is installed in such a manner that a valve body 3 extends substantially horizontally, to thereby be opened when fuel flows toward the tank 22 at the time of fuel supply and closed when fuel flows reversely. Referring to the right side of FIG. 1, a valve plate 1 is integral with rotating rod members 2 at a position displaced from the center line so that it maintains the closed state due to its own weight. Since the valve plate 1 in the closed state is affected by a pressure from the tank 22, mechanical strength of synthetic resin, surface ribs, an appropriate thickness and so forth are arranged to make the valve plate 1 rigid enough to stand the pressure.

Figure 1:
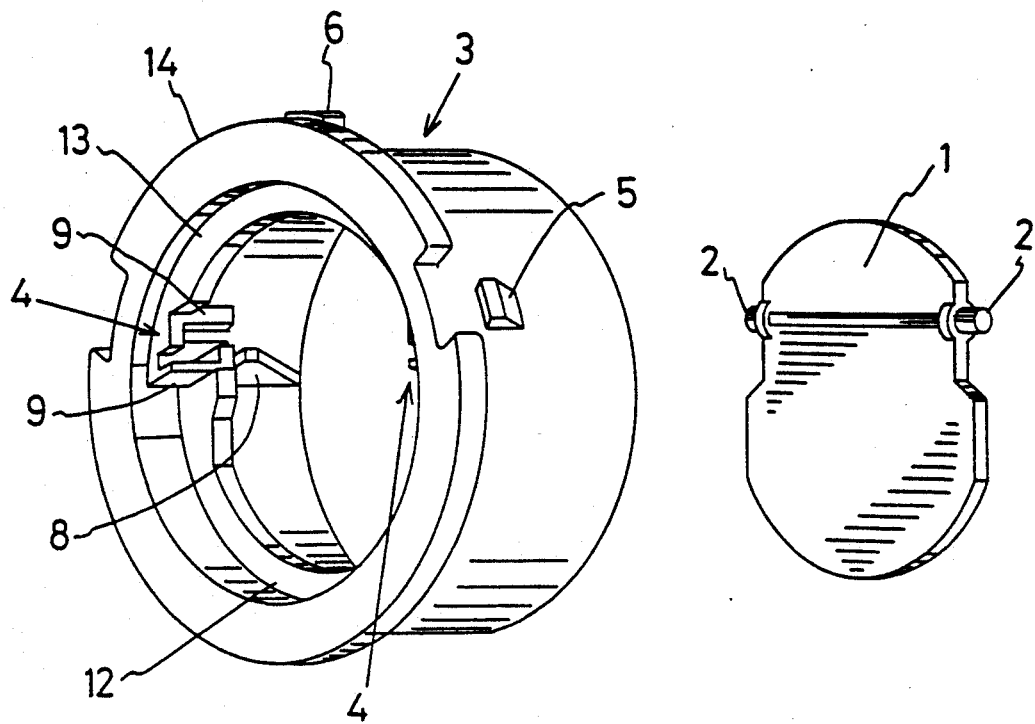
FIG. 1 is an exploded perspective view of a check valve apparatus for a fuel tank according to the present invention.
Figure 2:
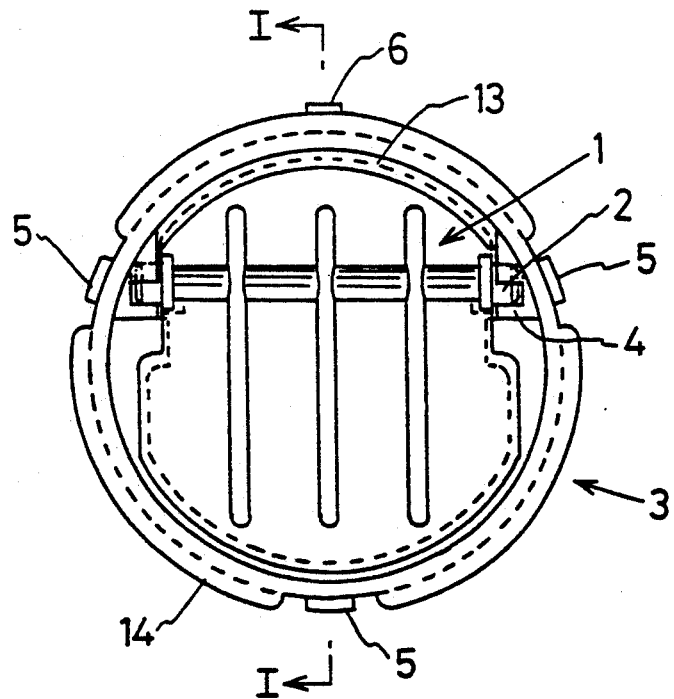
FIG. 2 is a front view of the apparatus when assembled.

Referring to the left side of FIG. 1, the valve body 3 made of synthetic resin and having an annular shape which supports the outer periphery of the valve plate 1 is provided with bearing sections 4 at positions corresponding to the valve plate rotating rod members 2. Each of the bearing sections 4 comprises hook-like upper and lower bearing projections 9 which are formed on the inner periphery of the valve body 3 so as to surround the associated valve plate rotating rod member 2. Also, on the inner periphery of the valve body 3, an inner peripheral rib 12 is provided on the rear side with respect to the center line of the rod members 2 and below the bearing sections 4, and an inner peripheral rib 13 is provided on the front side with respect to the center line of the rod members 2 and above the bearing sections 4, to thereby permit the valve plate 1 to rotate in only one direction. These inner peripheral ribs 12 and 13 also serve as a valve seat. In order to restrict further rotation of the valve plate 1 which has been opened and extended horizontally, stopper projections 8 are formed in the vicinity of the bearing sections 4 and on the rear side with respect to the center line of the rod members 2. When referring to FIGS. 2 to 6, structures of these component parts will be understood more clearly.

Figure 4:
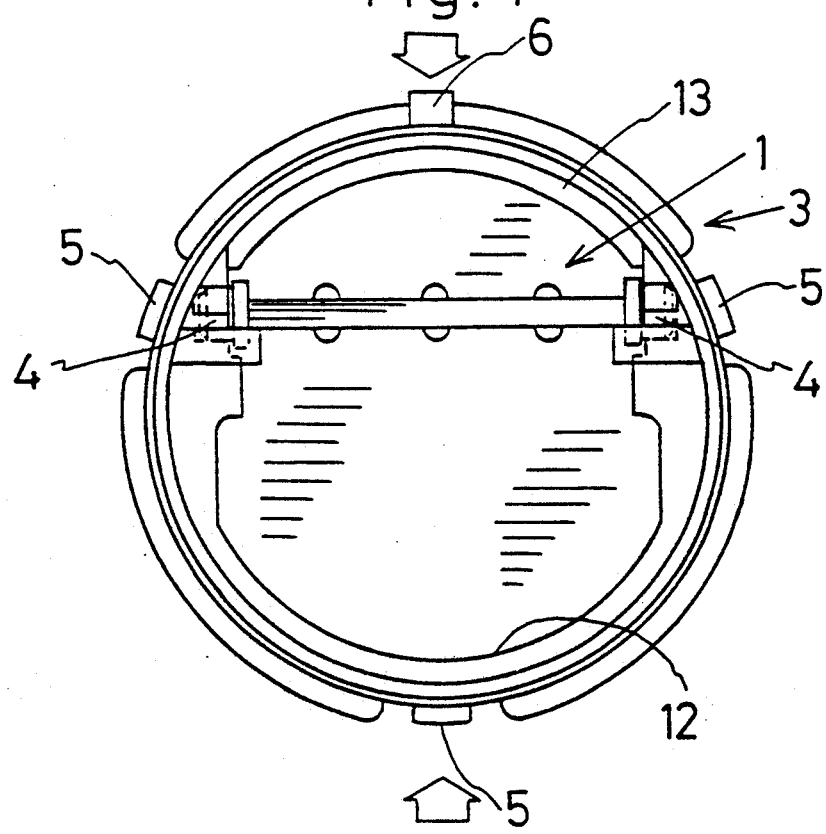
FIG. 4 is a back view of the apparatus when assembled, with a valve plate being open.
Figure 5:
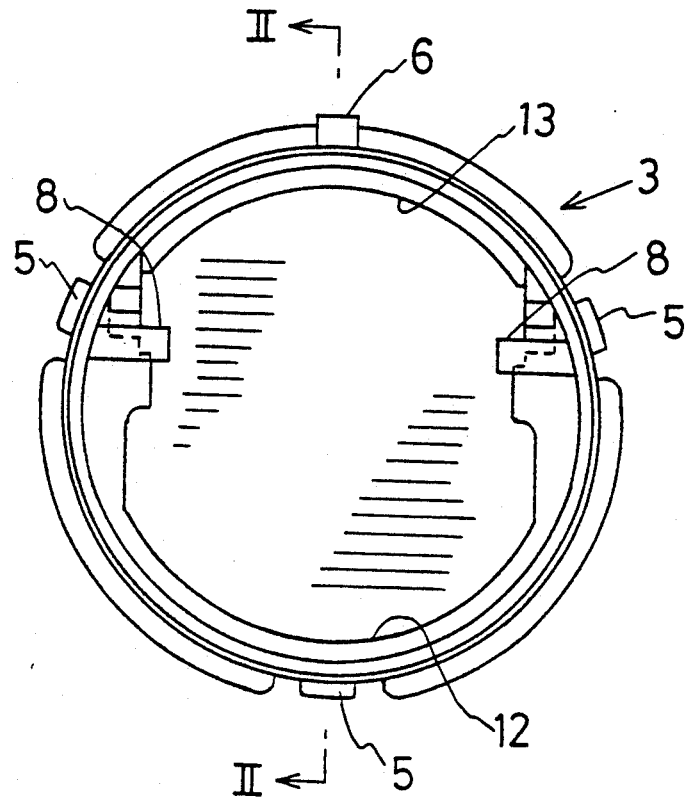
FIG. 5 is a front view of a valve body when the valve plate is removed.
Figure 6:
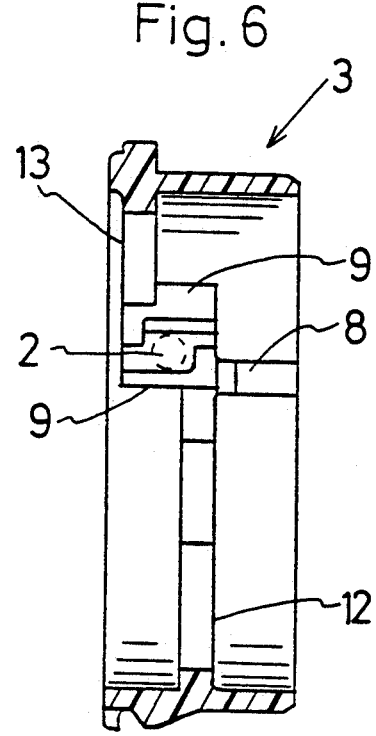
FIG. 6 is a cross-sectional view of the valve body, taken along a line II—II in FIG. 5.

In order to assemble the valve plate 1 with the valve body 3 in the check valve apparatus for the fuel tank according to the present invention, the annular valve body 3 is merely pressed against its resilience radially inwardly (toward the center) from directions indicated by upper and lower arrows in FIG. 4 to expand the diameter to enlarge the distance between the left and right bearing sections 4 so that the rotating rod members 2 projecting from both sides of the valve plate 1 can be fitted in the bearing sections 4. When pressing the valve body 3 is stopped, the bearing sections 4 recover the original posture, and the rotating rod members 2 are fitted in them by snap action, thus completing the assembly. In this manner, the apparatus can be constituted only of the two members.

Figure 3:
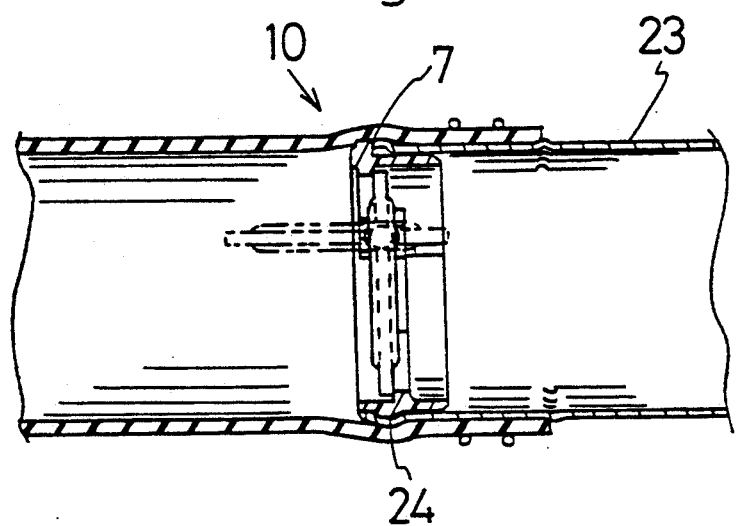
FIG. 3 is a cross-sectional view of the apparatus when installed in a pipe, taken along a line I—I in FIG. 2.

Retainer projections 5 are provided at three positions on the outer periphery of the valve body 3. Among these retainer projections 5, two upper ones are located at positions corresponding to the rotating rod members 2 which are formed at the position displaced from the Center line of the valve plate 1, while the remaining one is additionally provided at a lower position. A positioning projection 6 is formed at an upper location on the outer periphery of the valve body 3. As shown in FIG. 3, the apparatus of the invention can be properly set within the pipe 23 by merely fitting the positioning projection 6 in a cutout 7 formed in the pipe 23 during the setting operation of the apparatus. Another section of the outer periphery of the valve body 3 is formed as a flange 14 to be contacted with an end portion of the pipe 23 for the purpose of suitably positioning the apparatus and fluid-tightly connecting the peripheral portion of the valve body 3 with the end portion of the pipe 23.

When each of the upper retainer projections 5 is located at a position corresponding to the rotating rod member 2 of the valve plate 1 and formed on a portion of the outer peripheral side of the valve body 3 on the other side of which the bearing section 4 on an extension of the rotating rod member 2 is provided, the assembly is completed by merely pressing the retainer projections 5 into an annular recess 24 of the metal pipe 23.

Figure 8:
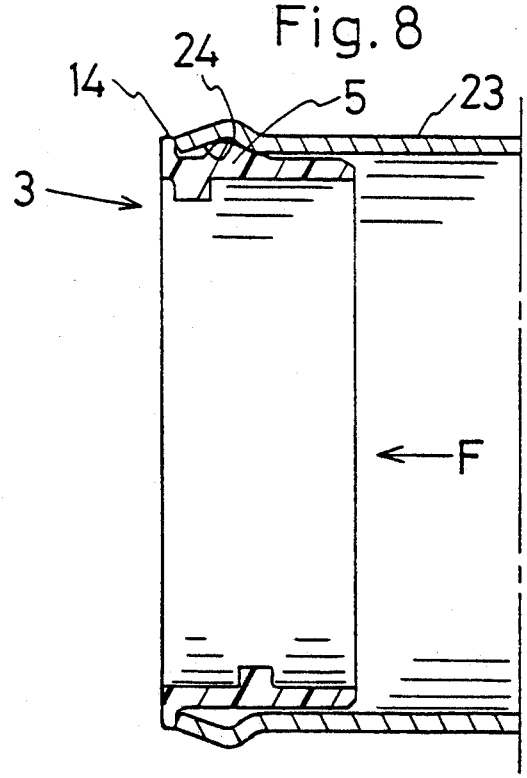
FIG. 8 is a vertical cross-sectional view showing a condition of the valve body attached in the metal pipe in FIG. 3.

FIG. 8 illustrates a condition in which the retainer projection 5 of the valve body 3 is closely fitted in the annular recess 24 of the pipe 23. When an external force F in a direction for withdrawing the valve body 3 is exerted on the valve body 3 in this condition due to a force of fluid flowing within the pipe 23, as shown in FIG. 9, a portion P of the valve body 3 with no retainer projection 5 or with no resistance is moved first. Consequently, the valve body 3 is inclined relative to the pipe 23, and strong engagement between a portion Q of the valve body 3 with the retainer projection 5 and the pipe 23 continues to be maintained. When the apparatus is inserted into the pipe 23, the length of the overlapped connection becomes as short as possible to facilitate the inserting operation. In order to insert the apparatus into a joint section of the pipe 23, the valve body 3 is inclined relative to the pipe 23, as shown in FIG. 10, so that the portion p of the valve body 3 with no retainer projection 5 will be closely fitted to the end portion of the pipe 23, and that the retainer projection 5 of the valve body 3 can be easily inserted into the annular recess 24 of the pipe 23. Similarly, when the apparatus is detached from the joint section of the pipe 23, the valve body 3 is inclined relative to the pipe 23, as shown in FIG. 10, so that the portion P of the valve body 3 with no retainer projection 5 will be closely fitted to the end portion of the pipe 23, and that the retainer projection 5 of the valve body 3 can be easily detached from the annular recess 24 of the pipe 23.

Moreover, since the retainer projections 5 are provided on the outer periphery of the bearing sections 4 of the valve body 3 which sustain the rotating rod members 2 projecting from both sides of the valve plate 1, the amount of radially inward deformation of the valve body 3 is limited by the valve plate rotating rod members 2 which serve as a strut, so that the valve body 3 can be prevented from coming off from the pipe 23 during operation.

As described heretofore, the check valve apparatus for the fuel tank according to the present invention is easy to assemble, and the number of component parts is lessened, thereby achieving the reduction of costs. The check valve apparatus is also arranged such that the valve plate will not be easily detached from the valve body, and that the valve body will not accidentally come off from the pipe. Besides, the check valve apparatus is improved in corrosion resistance, to thereby function favorably for a long period of time in such a manner as to be open when fuel flows normally toward the tank at the time of fuel supply and closed when fuel flows reversely.

What is claimed is:

1. A check valve apparatus, which is provided in an end of a pipe from a fuel supply spout to a fuel tank so that said check valve apparatus is opened when fuel flows toward said fuel tank at a time of fuel supply and is closed when fuel flows reversely, comprising:
   a valve plate made of synthetic resin, which is formed with rotating rod members as one body at a position displaced from the circle center point of the valve plate; and
   a valve body made of synthetic resin and having an annular shape which supports outer periphery of said valve plate, said valve body including retainer projections
   said retainer projections are provided on two portions of the outer peripheral side of said valve body, and on the other side of which portions there are formed bearing sections corresponding to said rotating rod members of the valve plate.

2. A check valve apparatus for a fuel tank according to claim 1, wherein at least said retainer projections are closely fitted in an annular recess formed in the inner surface of a pipe which is arranged to engage with said annular valve body.

3. A check valve apparatus installed between a fuel supply spout and a fuel tank so as to be opened when fuel flows toward said fuel tank and closed when fuel flows back, said valve apparatus comprising:
   a valve plate made of synthetic resin formed with rotating rod members as one body at a position displaced from a circle center point of said valve plate; and
   a valve body made of synthetic resin having an annular shape and supporting an outer periphery of said valve plate, said valve body including retainer projections provided on two portions of an outer periphery of said valve body and bearing section on an inner periphery so as to correspond to said rotating rod members of said valve plate.

4. A check valve apparatus, which is installed in a pipe connecting a fuel inlet to a fuel tank and is opened when fuel flows into said fuel tank and closed when fuel flows back comprising:
   a valve plate made of synthetic resin having rotating rod members near one end;
   an annular shape valve body made of synthetic resin which supports outer periphery of said valve plate, said valve body being provided with:
   two retainer projections provided on the outer periphery and two bearing sections on the inner periphery so that said rotating rod members of the valve plate are fitted therein, said retainer projections being connected to an annular recess formed inside of said pipe;

two inner peripheral ribs, one of said two ribs being on a rear side with respect to a center line of said rod members and below said bearing sections and another one of said two ribs being provided on a front side with respect to a center line of said rod members and above said bearing sections;

stopper projections formed in the vicinity of said bearing sections and on a rear side with respect to a center line of said rod members;

a positioning projection formed at an upper location on said outer periphery of said valve body;

hook-like upper and lower bearing projections formed on said inner periphery of said valve body; and a flange provided on said outer periphery of said valve body for positioning said check valve apparatus and fluid-tightly connecting a peripheral portion of said valve body to an end of said pipe.

5. A check valve apparatus according to claim 3, wherein said retainer projection are closely fitted in an annular recess formed in an inner surface of said pipe which engages with said annular valve body.

6. A check valve apparatus according to claim 4, wherein said retainer projection are closely fitted in an annular recess formed in an inner surface of said pipe which engages with said annular valve body.

* * * * *